O. S. HOFFMAN.
Machine for Making Yeast-Cakes.

No. 222,135.                Patented Dec. 2, 1879.

Witnesses
W. C. Coolie
Jno. C. MacGregor

Inventor
Orville S. Hoffman
By Coburn & Thacher
Attorneys

UNITED STATES PATENT OFFICE.

ORVILLE S. HOFFMAN, OF CHICAGO, ILLINOIS, ASSIGNOR TO CHARLES R. STEELE AND V. CLARENCE PRICE, OF SAME PLACE.

IMPROVEMENT IN MACHINES FOR MAKING YEAST-CAKES.

Specification forming part of Letters Patent No. 222,135, dated December 2, 1879; application filed July 28, 1879.

*To all whom it may concern:*

Be it known that I, ORVILLE S. HOFFMAN, of Chicago, in the county of Cook and State of Illinois, have invented a new and useful Improvement in Machines for Making Yeast-Cakes, which is fully described in the following specification, reference being had to the accompanying drawings, in which—

Figure 1:
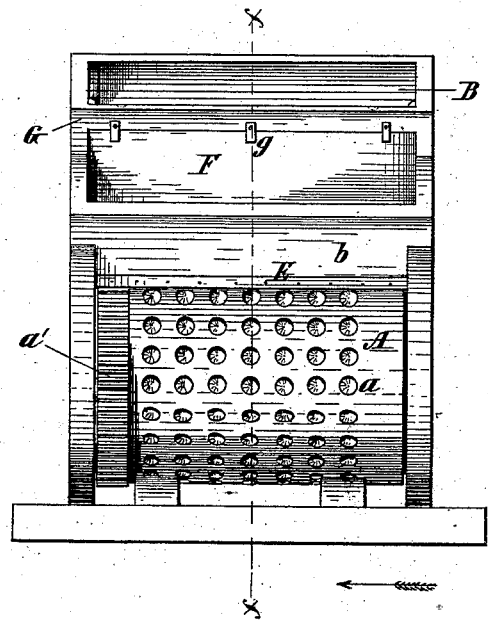
Figure 2:
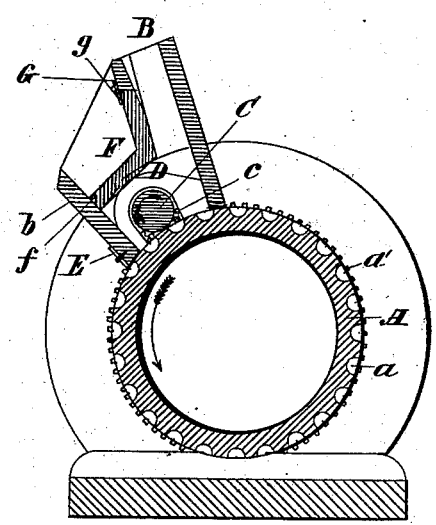

Figure 1 represents a front elevation of a machine embodying my improvements, and Fig. 2 a transverse section of the same, taken on the line $xx$, Fig. 1.

My invention relates to a machine for making yeast-cakes from the prepared batter, wherein hand-work is obviated, and especially to improvements in the machine shown and described in Letters Patent No. 208,272, dated September 24, 1878.

In the machine described in the patent above mentioned, the cups in the cylinder are filled with the yeast-batter by gravity only, and in practice it has been found that this is not sufficient to fill the cups with yeast, so as to make good hard cakes.

My invention consists in combining with a revolving cake-cylinder a pressure-roller, and a peculiarly-constructed housing.

The general construction of the machine is intended to be like that described in the above-named patent, or of any other ordinary construction suitable for the purpose; hence I have not shown in the drawings all parts of the machine, and shall not attempt to describe them here. As my improvement relates only to the cup-cylinder and the devices for filling the cups from the hopper, I have shown only so much of the machine as is necessary to illustrate my invention.

In the drawings, A represents the cake-cylinder, which is mounted suitably in the supporting-frame, and is provided with cups $a$, for the reception of the yeast-batter from which the cakes are to be made. One end of the cylinder is also provided with a gearing, $a'$. The hopper B is mounted above the cylinder, the bottom being open, and the cylinder arranged to revolve immediately underneath the sides of the hopper. Within this hopper a roller, C, is mounted, extending the length of the cylinder, and arranged to run in contact therewith, being provided at one end with a gear-pinion, $c$, which meshes with the gear $a'$ on the cylinder.

A housing, D, covers the pinion $c$ within the hopper to prevent the batter coming in contact therewith.

The revolution of the cake-cylinder will evidently rotate the roller C, the movement of the latter being in an opposite direction to that of the cylinder. Now, as the cake-cylinder is revolved in the direction shown by the arrow, the roller will be turned in the opposite direction, as shown by the arrow thereon in Fig. 2 of the drawings, and consequently the yeast batter or dough will be pressed into the cups under the action of the roller C, so as to be completely and compactly filled.

The hopper may be provided with mixing devices, such as are shown in the patent referred to, or any other known mechanism suitable for this purpose. The front wall $b$ of the hopper is provided with a knife or scraper, E, for removing surplus batter from the cylinder.

The revolution of the roller C in the direction described, will have a tendency to throw the batter up on the front wall of the hopper, and if this wall is plain and inclined, as usual, the batter will sometimes be forced out over the top. To prevent this I make the upper section, F, of the hopper with an inset, $f$, extending inward over the roller C, and acting as a bar to prevent the crowding upward of the yeast-batter, the upper portion of this part being nearly vertical. This section F is made removable, as shown in the drawings, the lower bent edge resting on the incline $b$, and the upper edge beveled and fitting underneath a narrow top-bar, G, and secured in place by buttons $g$.

Having thus described my invention, what I claim as new, and desire to secure by Letters Patent, is—

In a machine for making yeast-cakes, the combination of the revolving cup-cylinder, the pressing-roller, located, as described, within the hopper, the hopper and the inset F, substantially as and for the purposes set forth.

ORVILLE S. HOFFMAN.

Witnesses:
 JNO. C. MACGREGOR,
 W. C. CORLIES.